United States Patent Office
3,230,141
Patented Jan. 18, 1966

3,230,141
METHOD FOR PROTECTING FIBERS AGAINST ATTACK BY INSECTS AND BACTERIA WITH DIPHENYL UREA COMPOSITIONS
Wilhelm Ernst Frick, Alter Kirchweg, Pfeffingen, and Walter Stammbach, Basel, Switzerland, assignors to J. R. Geigy A.-G., Basel, Switzerland
No Drawing. Filed Aug. 12, 1960, Ser. No. 49,151
Claims priority, application Switzerland, Aug. 14, 1959, 76,959
12 Claims. (Cl. 167—38.6)

The present invention concerns new diphenyl urea derivatives having valuable insecticidal and bactericidal properties and an affinity to keratin fibres in aqueous dispersion and which protect the treated keratin material from attack and injury by larvae of microlepidopters (such as moths) and certain species of beetle (such as fur and carpet beetles).

Another object of the invention is a process for the production of these new diphenyl urea derivatives. As further objects of the invention are the pest control agents containing these new compounds as active substances and the use of these agents for pest control, in particular for the protection of keratin material from injury by insects; the invention further concerns, as industrial product, the keratin material protected in this way from injurious insects. In addition, the invention also concerns disinfectants and disinfectant cleansing agents, in particular textile washing agents and toilet soaps, which contain the new active substances as well as the use of these agents for the disinfection or simultaneous cleansing and disinfection of objects of all types, in particular also of fabrics containing cellulose.

It is known that halogenated diphenyl ureas have antibacterial and insecticidal properties which are particularly marked if there is a $CF_3$ group in the molecule.

It has now surprisingly been found that substituted diphenyl urea derivatives having two $CF_3$ groups in one benzene nucleus, of the general formula

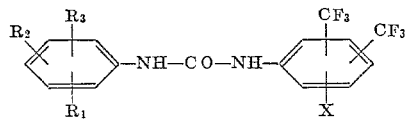

wherein $R_1$ represents hydrogen, a halogen atom, especially chlorine or bromine, the trifluoromethyl radical or the nitro group, $R_2$ represents hydrogen, a halogen atom, especially chlorine or bromine, the trifluoromethyl radical or a low molecular alkyl radical such as methyl, ethyl, propyl, isopropyl etc., preferably methyl, or a low molecular alkoxy radical, preferably the methoxy or ethoxy radical, $R_3$ represents hydrogen, a halogen atom, especially chlorine, or the phenoxy or phenylmercapto radical which latter radicals may be substituted by one or more halogen atoms, especially chlorine, or by one or more low molecular alkyl groups such as methyl, ethyl, propyl, isopropyl, isobutyl, n-butyl and amyl radicals, and X represents hydrogen, a halogen atom preferably chlorine, or a low molecular alkoxy radical, especially the methoxy radical, have considerably better insecticidal activity, in particular against insects, in all stages of their development, which are injurious to keratin material such as moth larvae, fur and carpet beetle larvae and, in addition, are suitable, because of their better bactericidal activity, as disinfectant and antibacterial active ingredients for the production of disinfectants and also of disinfectant washing and cleansing agents. In the general Formula I, the two $CF_3$ groups are advantageously in the meta position, one with respect to the other, in particular in the 3- and 5-positions of the benzene nucleus.

The new diphenyl urea derivatives of the general Formula I can be produced by reacting by known methods, possibly in steps, one mol of a reactive derivative of carbonic acid with one mol of each of two aminobenzene compounds of the general formulae

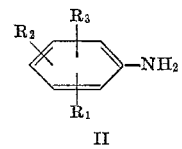

and

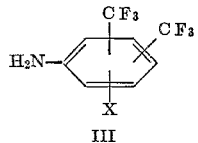

wherein $R_1$, $R_2$, $R_3$ and X have the meanings given above.

Diphenyl urea derivatives according to the invention which are particularly insecticidally active are those in which the two $CF_3$ groups are in the 3- and 5-positions of the first phenyl radical and in which the other phenyl radical is unsubstituted or substituted only by chlorine or trifluoromethyl, which substituents are not in the ortho-position to the carbamide bridge. These compounds correspond to the formula

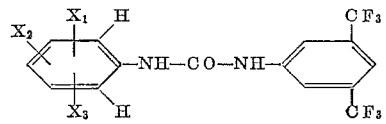

wherein:

$X_1$ and $X_2$ represent hydrogen, chlorine atoms or $CF_3$ groups, and $X_3$ is hydrogen or a chlorine atom.

Preferred diphenyl urea derivatives of the above formula IV are those which are substituted either by two chlorine atoms in the 3- and 4-positions to the carbamide bridge or by one $CF_3$ group in the 3-position; in the latter case, the 4-position of the phenyl radical can be further substituted by a chlorine atom.

Examples of suitable substituted starting aminobenzene compounds of the general Formula II are, besides aniline: 3,5 - bis - (trifluoromethyl) - aniline, 3-trifluoromethyl-4-chloraniline, 3-trifluoromethyl-6-chloraniline, 3,5-dichlor-, 3,4,5-trichlor-, 2,4,5-trichloro-, 2-methoxy - 4,5 - dichloroaniline, 3-trifluoromethyl-4-ethoxy aniline, 2-trifluoromethyl-4,5-dichloraniline, 4-nitro-, 4-chloro-, 3,4-dichloro-, 2-chloro-5-trifluoromethyl-aniline, 3-trifluoromethyl aniline, 2,4-dichloraniline, 3-chloro-4-bromaniline, 2,4-dibromaniline, 3-chloro-4-trifluoromethyl aniline, 2,5-dichloro-4-trifluoromethyl aniline and 2-nitro-4-chloraniline; as starting materials of the general Formula II containing phenoxy or phenylmercapto groups can be mentioned: 4-phenoxy-, 3-phenoxy-, 4-(4'-chlorophenoxy)-, 2-(4'-chlorophenoxy)-5-chloro-, 4-(3'4'-dichlorophenoxy)-, 4-(2', 4'-dichlorophenoxy)-, 2-(4'-chlorophenoxy) - 5 -trifluoromethyl-, 2-(4'-amylphenoxy)-5-chloro-, 2-(4'-chlorophenoxy)-5-methyl-, 2-(3',4'-dichlorophenoxy)-5-methyl-, 4-(4'-amylphenoxy)-, 4-(4'-isobutylphenoxy)-, 2-(4'-methylphenoxy)-5-methyl-, 2-(3',4'-dimethylphenoxy)-5-methyl-, 4-(4'-chlorophenylmercapto)- and 4-(4'-methylphenylmercapto)- aniline.

The preferred starting aminobenzene compound of the general Formula III is 3,5-bis-(trifluoromethyl)-aniline. As other starting materials of the general Formula III can be mentioned: 3,5-bis(trifluoromethyl)-4-chloraniline and 2,4-bis-(trifluoromethyl)-6-methoxy aniline.

As reactive derivatives of carbonic acid in the process according to the invention are used: the acid halides in particular phosgene, the acid esters in particular the phenol esters, the acid halide monoesters particularly the chlorocarbonic acid phenyl esters, the acid amides or imides particularly urea. Principally phosgene and the chlorocarbonic acid phenyl esters are used in the stepwise reaction for the production of unsymmetrically substituted diphenyl urea derivatives of the above Formula I. For this purpose, these are reacted by methods known per se first with 1 mol of one of the two aminobenzene compounds of the Formulae II or III used according to the invention to form the corresponding phenyl carbamic acid chlorides or phenol esters which are then reacted with 1 mol of the other aminobenzene compound to form the diphenyl urea derivative. If desired, the reaction products of 1 mol of phosgene with 1 mol of aminobenzene compound of the Formula II or III can be converted, also by known methods, for example by heating in inert higher boiling organic solvents such as nitrobenzene or o-dichlorobenzene while splitting off hydrogen halide, into the phenyl isocyanates corresponding to the aminobenzene compounds listed above and then suitably chosen aminobenzene compounds of the Formula III or II can be added to these compounds. Symmetrically substituted derivatives of diphenyl urea according to the invention, such as e.g. 3,5,3',5'-tetra-(trifluoromethyl)-diphenyl urea, are produced advantageously by heating 2 mols of the bis-(trifluoromethyl)-aminobenzene compound with 1 mol of urea or phosgene, e.g. in aqueous solution, whereupon the diphenyl urea derivative separates direct in a pure form while ammonia or hydrochloric acid is split off.

The new insecticidal derivatives of diphenyl urea are white, well crystallised substances which have defined melting points. They are practically insoluble in water but dissolve well, particularly in the warm, in organic solvents such as, e.g. dialkyl ketones, chlorobenzenes, nitrobenzene, ethylene glycol monoalkyl ethers, pyridine bases etc.

For use in an aqeuous liquor, advantageously the finely milled powders of the active substance or its solution in an organic solvent which is miscible with water, are mixed with capillary active wetting and dispersing agents such as, e.g. with the formaldehyde condensation product of naphthalene sulphonic acid or with the polyalkylene glycol ethers of phenols which contain a higher molecular aliphatic or alicyclic hydrocarbon radical as ring substituent. On stirring such preparations in aqueous treatment liquors, milky dispersions are obtained, from which the diphenyl urea derivatives according to the invention are fixed fast to washing, milling, light and dry cleaning onto keratin fibres, in particular wool, in the warm. Keratin fibres treated in this way with a content of at least 0.1 to 0.5% of active substance are durably protected from injury by larvae of microlepidopters and certain types of beetle.

Compared with the known, halogenated diphenyl ureas or those containing $CF_3$ groups, the new compounds having two $CF_3$ groups in the same benzene ring have the advantage of considerably greater activity, particularly against the injurious larvae of Attagenus and Anthrenus species.

The following examples illustrate the production process according to the invention. Parts are given therein as parts by weight and the temperatures are in degrees centigrade.

*Example 1*

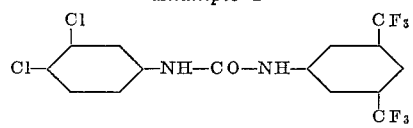

229 parts of 3,5-bis-(trifluoromethyl)-aniline are added to a solution of 188 parts of 3,4-dichlorophenyl isocyanate (produced by known methods from 3,4-dichloraniline and phosgene, see, for example, W. Siefken, Annalen der Chemie, 562, 96–136, (1948) in 1000 parts of nitrobenzene. The reaction mixture is heated for 3 hours at 80°. On cooling, the greater part of the diphenyl urea derivative precipitates. It is filtered off under suction and further purified by recrystallisation from methanol. The pure 3,5-bis-(trifluoromethyl)-3',4' - dichloro-N,N' - diphenyl urea melts at 210–212°.

*Example 2*

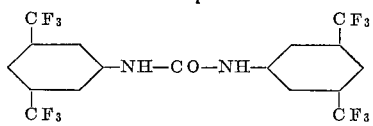

229 parts of 3,5-bis-(trifluoromethyl)-aniline are dissolved in 800 parts of acetone. Phosgene is introduced into this solution at 35–40° and at the same time a solution of 190 parts of sodium acetate in 500 parts of water is added dropwise. Phosgene is introduced until the solution just becomes weakly acid. The reaction mixture is then diluted with water and the precipitate which forms is filtered off under suction. After washing with water it is recrystallised from methanol. The melting point of the pure 3,5,3',5'-tetra-(trifluoromethyl)-N,N' - diphenyl urea is 242–243°.

*Example 3*

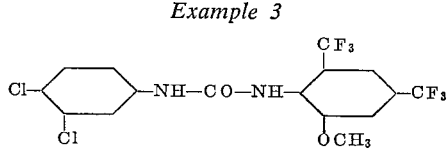

259 parts of 2-methoxy-4,6-bis-(trifluoromethyl)-aniline are dissolved in 600 parts of chlorobenzene and 188 parts of 3,4-dichlorophenyl isocyanate are added to this solution dropwise at 60°. The reaction mixture is kept for 4 hours at 60–65° and then cooled whereupon the greater part of the reaction product precipitates in crystalline form. It is filtered off under suction and, in the crude form, melts at 200–210°. The pure compound is obtained by recrystallising twice, first from chlorobenzene and then from isopropanol. It then melts at 220–222°.

*Example 4*

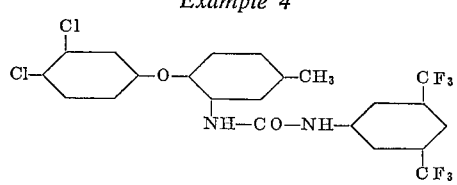

A solution of 252 parts of 3,5-bis-(trifluoromethyl)-phenyl isocyanate in 2000 parts of chlorobenzene is added dropwise to a previously prepared solution of 278 parts of 2-amino-4-methyl-3',4'-dichlorodiphenyl ether in 1000 parts of benzene. The mixture is heated for 6 hours at 80–85°. After cooling, the crude product is filtered off under suction and, after drying in vacuo, it melts at about 180°. The compound is purified by recrystallising twice from chlorobenzene and then melts at 190–192°.

The following compounds can be produced as described in the previous examples from carbonic acid derivatives, and corresponding starting materials of Formula II or their isocyanates, and 3,5-bis-(trifluoromethyl)-aniline; wool treated with these compounds is protected from injury by the larvae of moths, fur and carpet beetles.

| Diphenyl urea derivative | M.P., degrees |
|---|---|
| 4-Cl, 2-CF₃ -C₆H₃-NH-CO-NH- C₆H₃- 2,5-(CF₃)₂ | 164–166 |
| 3,5-Cl₂-C₆H₃-NH-CO-NH-C₆H₃-2,5-(CF₃)₂ | 212–214 |
| 2,4,5-Cl₃-C₆H₂-NH-CO-NH-C₆H₃-2,5-(CF₃)₂ | 318–321 |
| 2,4,6-Cl₃-C₆H₂-NH-CO-NH-C₆H₃-2,5-(CF₃)₂ | 280–283 |
| 2-OCH₃, 4-Cl -C₆H₃-NH-CO-NH-C₆H₃-2,5-(CF₃)₂ | 190–193 |
| 4-OC₂H₅, 3-CF₃-C₆H₃-NH-CO-NH-C₆H₃-2,5-(CF₃)₂ | 203–205 |
| 4-Cl, 2-CF₃, (2nd Cl) -C₆H₂-NH-CO-NH-C₆H₃-2,5-(CF₃)₂ | 194–197 |
| 4-O₂N-C₆H₄-NH-CO-NH-C₆H₃-2,5-(CF₃)₂ | 289–293 |
| 4-Cl-C₆H₄-NH-CO-NH-C₆H₃-2,5-(CF₃)₂ | 212–213 |
| C₆H₅-NH-CO-NH-C₆H₃-2,5-(CF₃)₂ | 183–184 |
| 2,5-(CF₃)₂-C₆H₃-NH-CO-NH-C₆H₃-2,5-(CF₃)₂ | 172–173 |
| 4-Cl, 2-CF₃-C₆H₃-NH-CO-NH-C₆H₃-2,5-(CF₃)₂ | 202–203 |
| 2-Cl, 5-CF₃-C₆H₃-NH-CO-NH-C₆H₃-2,5-(CF₃)₂ | 208–210 |

| Diphenyl urea derivative | M.P., degrees |
|---|---|
| 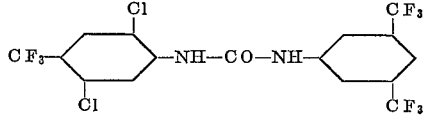 | 190-192 |
| 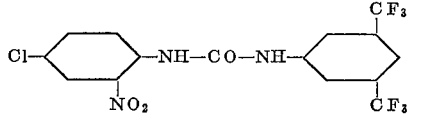 | 184-186 |
| 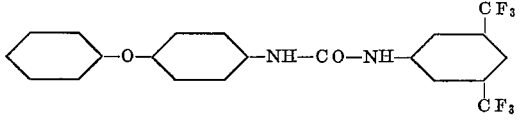 | 171-172 |
| 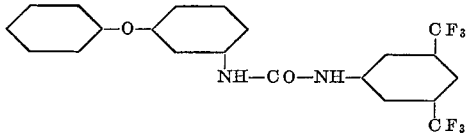 | 176-177 |
| 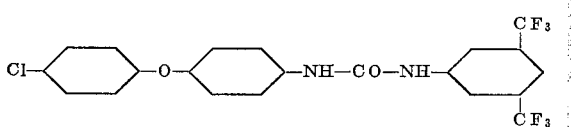 | 181-183 |
| 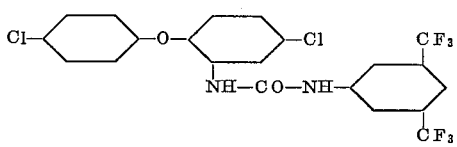 | 196-198 |
| 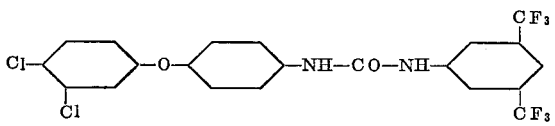 | 188-190 |
| 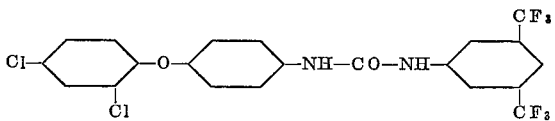 | 182-183 |
| 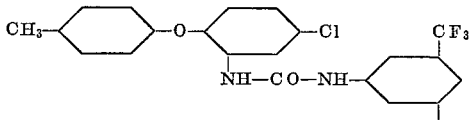 | 189-191 |
| 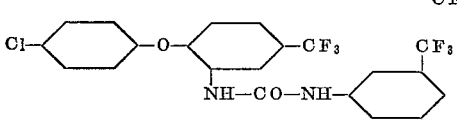 | 199-200 |
| 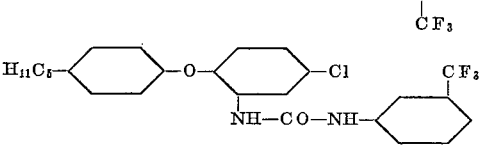 | 190-192 |
| 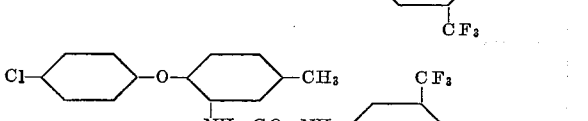 | 183-185 |
| 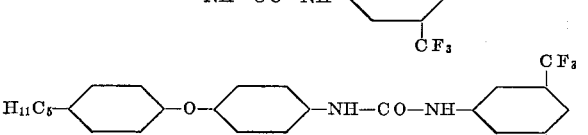 | 179-180 |

| Diphenyl urea derivative | M.P., degrees |
|---|---|
| 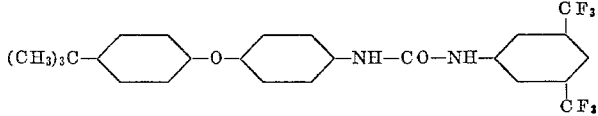 | 190–191 |
| 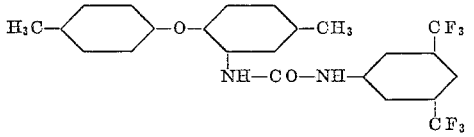 | 180–182 |
| 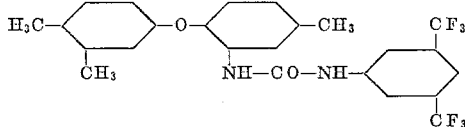 | 178–180 |
| 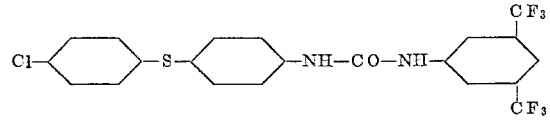 | 186–188 |
| 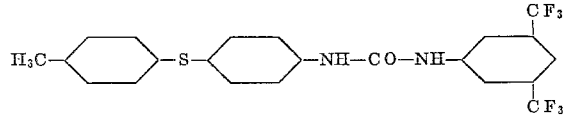 | 182–183 |
| 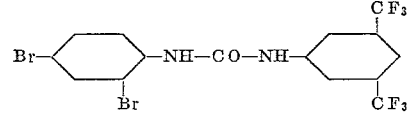 | 188–190 |
| 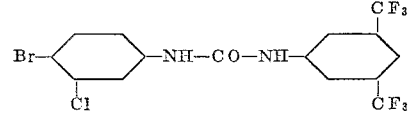 | 217–218.5 |

On choosing 3,5-bis(trifluoromethyl)-4-chloraniline as starting material of the Formula III, the following compounds can be produced in a similar manner.

| | M.P., degrees |
|---|---|
| 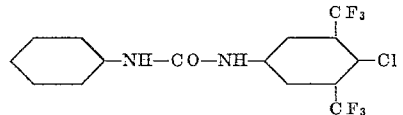 | 185–191 |
| 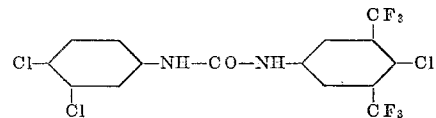 | 223–225 |

The diphenyl urea derivatives of Formula I produced by the process described have considerable affinity to keratin material and are excellently suitable, therefore, for the protection of keratin material from injury by insects, particularly for the fast-to-washing mothproofing of such types of materials, both in the raw and processed state, e.g. of raw or processed wool as well as other animal hairs, fells and furs. In addition, these compounds can be employed for the impregnation of wool and woollen articles whereby excellent mothproofing is also attained.

Apart from their insecticidal activity against the larvae of the clothes moth, the compounds of Formula I also have such an action against the larvae of the fur and carpet beetles so that keratin materials such as blankets, woollen carpets, woollen underwear, woollen clothes and knitted goods treated with the compounds according to the invention are protected against all types of injurious insects.

An example is given below of the application of the new active ingredients.

*Example 5*

0.2 part of the compound according to Example 1 is dissolved in 5 parts of glycol monomethyl ether. 5 parts of sulphonated castor oil are added to this solution which is then diluted to 6000 parts by volume with water. 200 parts of wool are introduced into the cold dispersion obtained and it is then slowly brought to the boil, and finally boiled for one hour. After rinsing and drying in the usual way, the wool so treated proves to be completely resistant to attack by the larvae of moths and Attagenus and Anthrenus species.

Apart from the insecticidal activity, the compounds of Formula I according to the invention have also a very good bactericidal action.

For most purposes for which antibacterial active substances are used for disinfection, whether for the purpose of simultaneous cleansing or only for disinfection itself, it is important that the active substances retain their activity in the presence of capillary active substances. This is the case with the compounds used according to the invention as active substances so that they are excellently suitable for incorporation into disinfectant washing and cleansing agents as well as into disinfectants which in their composition also contain capillary active substances and which do not serve the purpose of cleansing, for example, emulsifying and dispersing agents.

For the production of disinfectant washing and cleansing agents, the active substances of general Formula I used according to the invention are incorporated in a finely distributed form or possibly dissolved in organic solvents into the cleansing agents which have possibly been kept in a liquid condition. In particular, capillary active substances of an anion active type such as alkali metal soaps or ammonium soaps of higher fatty acids, salts of alkyl sulphuric acids or of aliphatic or aromatic sulphonic acids; cation active substances such as quaternary ammonium compounds having at least one long chain aliphatic or araliphatic radical, as well as non-ionogenic substances such as the condensation products of ethylene oxide with higher alkanols, with alkyl phenols or with partial fatty acid esters of polyhydroxy compounds such as, e.g. sorbitan, are used as washing and cleansing agents.

Agents which are only intended for disinfectant purposes can be solutions, suspensions or emulsions which, apart from the active substances used according to the invention, possibly also contain capillary active substances, for example of the type given above. Preparations of semi-solid, ointment-like consistency can also be used as disinfectants. Disinfectants according to the invention can be applied by painting or spraying the objects to be disinfected with the preparation concerned. It is also sometimes possible to dip the objects into the preparation.

Contents of a few percent of active substances used according to the invention in the disinfectant, washing or cleansing agents, and of fractions of percentages in the disinfectant application liquors possibly used for simultaneous cleansing, are sufficient to attain effective disinfection.

It was not to have been expected that the active substances used according to the invention would retain their antibacterial activity in the presence of capillary active substances, in particular in the presence of the alkali metal soaps of higher fatty acids which are the most important components of washing agents. The active substances used also have good fastness to light so that they cause practically no yellowing in soaps.

Apart from the active substance, the soaps or other washing and cleansing agents can contain the usual fillers such as alkali sulphates, carbonates or phosphates as well as the other additives usual in cleansing agents.

The disinfectant cleansing agents according to the present invention can be put to the most various uses. For example, they can be used in human and veterinary hygiene for cleansing and simultaneous protection against bacteria causing diseases either direct on the skin or via the mouth or causing perspiration odours. Examples of such infective bacteria are Staphylococcus aureus, Escherichia coli, Sarcina lutea and Sarcina alba, and of those decomposing perspiration are Proteus vulgaris, Bacillus mesenthericus and Bacillus subtilis. In such cases, the most usual cleansing agent components are soaps, but also, according to the present invention, the antibacterial active ingredients defined above can also be combined with cosmetics such as ointments, creams or skin lotions which contain other capillary active substances, for example in the form of dispersing agents.

Naturally, disinfectants can also be produced which, in addition to the active substances according to the present invention, contain other active ingredients which are suitable for increasing or modifying the action.

Disinfectant cleansing agents according to the present invention can also be used, for example, for the cleansing of textiles or leather; the ready-for-use soaking, washing, cleansing and rinsing liquors to which the antibacterial active ingredients have been added later, i.e. after dissolving the capillary active substances in water, also being washing and cleansing agents according to the present invention. Like the use thereof, they also fall within the scope of the present invention. Also, the substituted diphenyl ureas of the general Formula I can be combined with dry cleaning agents, i.e. dissolved in aliphatic or aromatic, possibly chlorinated, hydrocarbons, most of which generally also contain capillary active wetting and cleansing agents which are soluble in oil.

Finally, the antibacterial cleansing agents according to the present invention can be used also for the disinfection of other organic or inorganic objects. Thus, they are valuable, for example, for the antibacterial cleansing of apparatus and objects in hospitals such as surgical instruments, instrument tables, vessels, and laboratory utensils, as well as of equipment and vessels in food and fermentation industries.

The following examples illustrate the production of the disinfectants and disinfectant cleansing agents according to the invention as well as the use of these agents. Parts are given therein as parts by weight and the temperatures are in degrees centigrade.

*Example 6*

75 parts of coconut oil (saponification number 262) and 25 parts of castor oil (saponification number 175) are saponified at 115° with 120 parts of an about 15% sodium hydroxide solution. 3 parts of 3,5-bis-(trifluoromethyl)-3',4'-dichloro-N,N'-diphenyl urea or 3,5-bis-(trifluoromethyl)-3',5'-dichloro-N,N'-diphenyl urea are then added to the still liquid soap and the mixture is homogenised well. After salting out, the soap is poured into moulds and allowed to cool. Pieces of household soap are obtained which, on being used for washing, are characterised by a good antibacterial action.

*Example 7*

To produce an antibacterial toilet soap, 98 parts of soda soap filings are well mixed with 2 parts of 3,5-bis-(trifluoromethyl) - 4' - chloro - N,N' - diphenyl urea. The mixture is then milled and pressed into the usual moulds.

*Example 8*

A combination of 2 parts of 3,5-bis-(trifluoromethyl)-4'-chloro-N,N'-diphenyl urea with 25 parts of triethanolamine salt of n-dodecyl sulphuric acid, 1 part of n-dodecyl alcohol, 3 parts of triethanolamine sulphate, 1 part of lauric acid monoglyceride and 68 parts of water can be used as a liquid toilet soap and also as shampoo. It has a good antibacterial action.

*Example 9*

5 parts of 3,5,3'-tri- (trifluoromethyl)-4'-chloro-N,N'-diphenyl urea, 7 parts of a non-ionogenic washing agent (obtained by condensing 2,4-diamyl phenol with 10–12 mols of ethylene oxide), 30 parts of sodium metasilicate and 58 parts of tetrasodium pyrophosphate are well mixed together whereupon a cleansing agent having antibacterial properties is obtained. A 1% aqueous solution of this agent is excellently suitable as a disinfectant washing liquor for the cleansing of linen, clothes, crockery and other objects.

*Example 10*

A disinfectant dry cleaning agent is obtained by dissolving 0.5 part of 3,5,3′,5′-tetra-(trifluoromethyl)-N,N′-diphenyl urea and 5 parts of a condensation product of nonyl phenol with 15 mols of ethylene oxide in 94.5 parts of tetrachloroethane or the same amount of trichloroethylene.

*Example 11*

An antibacterial skin cream is obtained by thoroughly mixing the following components:

13 parts of glycol monostearate, 1 part of sodium dodecyl sulphate, 2 parts of polyethylene glycol 1500, 3 parts of wax, 3 parts of viscous paraffin oil, 2 parts of wool fat, 3 parts of polyoxyethylene sorbitan mono-oleate, 6 parts of glycerine, 0.1 part of perfume, 0.1 part of p-hydroxybenzoic acid methylester, 2 parts of 3,5-bis-(trifluoromethyl)-3′,4′-dichloro-N,N′-diphenyl urea. Instead of 3,5 - bis - (trifluoromethyl) - 3′,4′ - dichloro - N,N′ - diphenyl urea, also 3,5-bis-(trifluoromethyl)-4′-chlorodiphenyl urea can be used.

What we claim is:

1. A process for the protection of keratin material from injurious insects which comprises applying to the keratin fibres and to textiles containing keratin, an insecticidal effective amount of a composition containing as the essential active ingredient, a compound of the formula

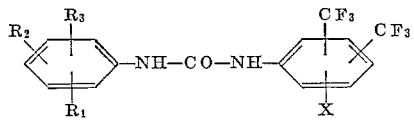

wherein:

$R_1$ represents a member selected from the group consisting of hydrogen, chlorine, bromine, trifluoromethyl and nitro, $R_2$ represents a member selected from the group consisting of hydrogen, chlorine, bromine, trifluoromethyl, low molecular alkyl and low molecular alkoxy, $R_3$ represents a member selected from the group consisting of hydrogen, chlorine, phenoxy, phenylmercapto, chlorinated phenoxy, chlorinated phenylmercapto, alkyl-substituted phenoxy and alkyl-substituted phenylmercapto, and X is a member selected from the group consisting of hydrogen, chlorine and methoxy, the two $CF_3$ radicals being in meta position to each other.

2. A process for the protection of keratin material from injurious insects which comprises applying to the keratin fibres and to textiles containing keratin, an insecticidal effective amount of a composition containing as the essential active ingredient the compound 3,5-bis-(trifluoromethyl)-3′,4′-dichloro-N,N′-diphenyl urea.

3. A process for the protection of keratin material from injurious insects which comprises applying to the keratin fibres and to textiles containing keratin, an insecticidal effective amount of a composition containing as the essential active ingredient the compound 3,5,3′,5′-tetra-(trifluoromethyl)-N,N′-diphenyl urea.

4. A process for the protection of keratin material from injurious insects which comprises applying to the keratin fibres and to textiles containing keratin, an insecticidal effective amount of a composition containing as the essential active ingredient the compound 3,5,3′-tri-(trifluoromethyl)-5′-chloro-N,N′-diphenyl urea.

5. As a composition of matter an inert liquid carrier and, finely distributed therein, an insecticidal effective amount of a compound having the formula

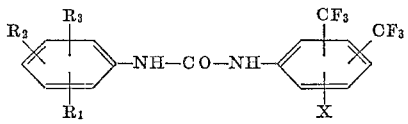

wherein:

$R_1$ represents a member selected from the group consisting of hydrogen, chlorine, bromine, trifluoromethyl and nitro, $R_2$ represents a member selected from the group consisting of hydrogen, chlorine, bromine, trifluoromethyl, low molecular alkyl and low molecular alkoxy, $R_3$ represents a member selected from the group consisting of hydrogen, chlorine, phenoxy, phenylmercapto, chlorinated phenoxy, chlorinated phenylmercapto, alkyl-substituted phenoxy and alkyl-substituted phenylmercapto, and X is a member selected from the group consisting of hydrogen chlorine and methoxy, the two $CF_3$ radicals being in meta position to each other.

6. A disinfectant cleansing agent comprising, as active ingredient, a germicidal effective amount of at least one compound of the formula

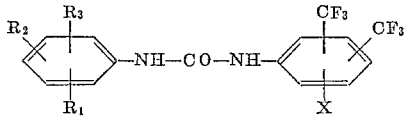

wherein:

$R_1$ represents a member selected from the group consisting of hydrogen, chlorine, bromine, trifluoromethyl and nitro, $R_2$ represents a member selected from the group consisting of hydrogen, chlorine, bromine, the trifluoromethyl, low molecular alkyl and low molecular alkoxy, $R_3$ represents a member selected from the group consisting of hydrogen, chlorine, phenoxy, phenylmercapto, chlorinated phenoxy, chlorinated phenylmercapto, alkyl-substituted phenoxy, and alkyl-substituted phenylmercapto, and X is a member selected from the group consisting of hydrogen, chlorine and methoxy, the two $CF_3$ radicals being in meta position to each other, and a capillary active carrier for said active ingredient.

7. A disinfectant cleansing agent comprising, as active ingredient, 2% to about 6% by weight of at least one compound of the formula

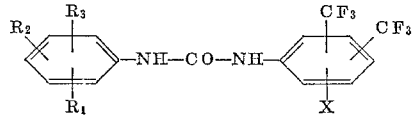

wherein:

$R_1$ represents a member selected from the group consisting of hydrogen, chlorine, bromine, trifluoromethyl and nitro, $R_2$ represents a member selected from the group consisting of hydrogen, chlorine, bromine, trifluoromethyl, low molecular alkyl and low molecular alkoxy, $R_3$ represents a member selected from the group consisting of hydrogen, chlorine, phenoxy, phenylmercapto, chlorinated phenoxy, chlorinated phenylmercapto, alkyl-substituted phenoxy and alkyl-substituted phenylmercapto, and X is a member selected from the group consisting of hydrogen, chlorine and methoxy, the two $CF_3$ radicals being in meta position to each other, and a capillary active carrier for said active ingredient.

8. A disinfectant cleansing agent according to claim 7 wherein the active ingredient is 3,5-bis(trifluoromethyl)-4′-chloro-N,N′-diphenyl urea.

9. A disinfectant cleansing agent according to claim 7 wherein the active ingredient is 3,5-bis-(trifluoromethyl)-3'4'-dichloro-N,N-diphenyl urea.

10. A disinfectant cleansing agent according to claim 7 wherein the capillary active carrier is an alkali metal soap of a higher fatty acid.

11. A method of disinfecting a site which is exposed to infection, which comprises applying to such site a germicidal effective amount of a disinfectant cleansing agent comprising, as active ingredient, a small amount of at least one compound of the formula

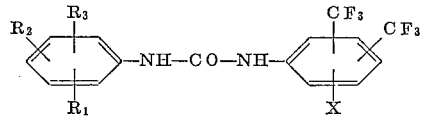

wherein:
$R_1$ represents a member selected from the group consisting of hydrogen, chlorine, bromine, trifluoromethyl and nitro,
$R_2$ represents a member selected from the group consisting of hydrogen, chlorine, bromine, trifluoromethyl, low molecular alkyl and low molecular alkoxy,
$R_3$ represents a member selected from the group consisting of hydrogen, chlorine, phenoxy, phenylmercapto, chlorinated phenoxy, chlorinated phenylmercapto, alkyl-substituted phenoxy and alkyl-substituted phenylmercapto, and
X is a member selected from the group consisting of hydrogen, chlorine and methoxy,
the two $CF_3$ radicals being in meta position to each other, and a capillary active carrier for said active ingredient.

12. A process for imparting germicidal activity to cellulosic materials which comprises applying thereto a germicidally effective amount of a compound of the formula

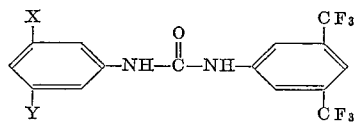

where X is a member of the group consisting of Cl and $CF_3$ and Y is a member of the group consisting of H, Cl, and $CF_3$.

References Cited by the Examiner
UNITED STATES PATENTS

| | | | |
|---|---|---|---|
| 2,470,160 | 5/1949 | Gertler | 167—30 |
| 2,745,874 | 5/1956 | Schetty et al. | 167—30 |
| 2,762,842 | 9/1956 | Haflinger et al. | 260—553 |
| 2,846,398 | 8/1958 | Beaver et al. | 252—106 |
| 2,867,658 | 1/1959 | Frick | 167—30 |
| 2,867,659 | 1/1959 | Model et al. | 260—552 |
| 2,995,488 | 8/1961 | Jones et al. | 167—30 |
| 3,006,955 | 10/1961 | Steinbrunn et al. | 260—553 |

OTHER REFERENCES

Journal of Laboratory and Clinical Medicine, February 1958, vol. 51, No. 2, pp. 185–197.

Journal of Medicinal and Pharmaceutical Chemistry, (1959), vol. 1, No. 2, pp. 121–133.

JULIAN S. LEVITT, *Primary Examiner.*

WILLIAM B. KNIGHT, MORRIS O. WOLK, IRVING MARCUS, LEWIS GOTTS, *Examiners.*